United States Patent [19]
Butler et al.

[11] Patent Number: 5,479,505
[45] Date of Patent: * Dec. 26, 1995

[54] TELEPHONE NETWORK ENCLOSURE CONTAINING PROTECTED TERMINATION DEVICE

[75] Inventors: Walter K. Butler, Sebago Lake; Mark P. Cote, Springvale; John J. Napiorkowski, Cape Elizabeth; Thomas W. Kroll, South Portland; Boyd G. Brower; N. Peter Mickelson, both of Gorham, all of Me.

[73] Assignee: Siecor Puerto Rico, Inc., Hickory, N.C.

[*] Notice: The portion of the term of this patent subsequent to Oct. 6, 2009, has been disclaimed.

[21] Appl. No.: 956,516

[22] Filed: Oct. 5, 1992

Related U.S. Application Data

[63] Continuation-in-part of Ser. No. 523,457, May 15, 1990, Pat. No. 5,153,910.

[51] Int. Cl.⁶ .................................................. H04M 9/00
[52] U.S. Cl. .......................... 379/412; 379/399; 361/641
[58] Field of Search .................................... 379/399, 412, 379/441, 442; 361/356

[56] References Cited

U.S. PATENT DOCUMENTS

| | | |
|---|---|---|
| D. 292,089 | 9/1987 | Smith et al. . |
| D. 315,140 | 3/1991 | Dowler . |
| 4,062,053 | 12/1977 | Cwirzen . |
| 4,086,648 | 4/1978 | Hines et al. . |
| 4,159,500 | 6/1979 | Baumbach et al. . |

(List continued on next page.)

OTHER PUBLICATIONS

Keptel brochure, "The Only Network Interface You'll Ever Use," Keptel, Ocean, N.J.
Siecor brochure, "Siecor Introduces New Multiline NID Solutions", Siecor Corp., Hickory, N.C.
Keptel brochure, "SNI–5000, Tomorrow's Network Interface System Today", Keptel Inc., 1985.
GTE brochure, "Weatherproof, Corrosion Proof . . . and We Guarantee It", Sylvania GTE Control Devices, Dec. 1984.
Lippincott brochure, "GL–700 Multi–Unit Network Interface Device", Lippincott Industries, Spokane, Wash., May 1988.
Lippincott advertisement, vol. 211, Telephony, Sep. 9, 1986.
GTE brochure, Protected Terminating Device NI–2006, GTE Control Devices, Standish, Me., May 1992.
GTE brochure, Protected Terminating Device PTD, GTE Control Devices, Standish, Me., May 1992.
GTE brochure, Protected Terminating Devices NI–2025, NI–2100, NI–2200, GTE Control Devices, Standish, Me., May 1992.
GTE brochure, Introducing the Next Step In the Evolution of Network Interface Technology, GTE Control Devices, Standish, Me., May 1992.
Keptel, Inc., brochure for the SNI®–4600 Network Interface System, Feb. 1988.
Keptel, Inc., brochure for the SNI®–4600 Network Interface System, Oct. 1991.
GTE Products Corporation, brochure for the Sylvania Control Devices CP–765 Network Interface Device, printed Jun. 1987.
GTE Products Corporation, brochure for the Sylvania Control Devices CP–761 Network Interface Device, printed Sep. 1989.

*Primary Examiner*—James L. Dwyer
*Assistant Examiner*—M. Shehata
*Attorney, Agent, or Firm*—J. David Abernethy

[57] ABSTRACT

This invention discloses a telephone network interface enclosure comprising a telephone company compartment having a cover therefor and a telephone subscriber compartment having a cover therefor. A network termination module containing a protector element is disposed in the network interface enclosure. One end of the network termination module is secured in the telephone subscriber compartment while the other end is secured in the telephone company compartment.

5 Claims, 5 Drawing Sheets

U.S. PATENT DOCUMENTS

| | | | |
|---|---|---|---|
| 4,160,880 | 7/1979 | Brey. | |
| 4,488,008 | 12/1984 | Dellinger et al. | 179/81 |
| 4,516,818 | 5/1985 | Johnston et al. . | |
| 4,560,839 | 12/1985 | Dillard | 179/81 |
| 4,588,238 | 5/1986 | Mickelson et al. | 339/91 |
| 4,613,732 | 9/1986 | Cwirzen et al. | 179/178 |
| 4,624,514 | 11/1986 | Smith | 379/412 |
| 4,647,725 | 3/1987 | Dellinger et al. | 329/29 |
| 4,723,919 | 2/1988 | Crane | 439/521 |
| 4,741,032 | 4/1988 | Hampton | 379/399 |
| 4,742,541 | 5/1988 | Cwirzen et al. | 379/412 |
| 4,749,359 | 6/1988 | White | 439/133 |
| 4,789,348 | 12/1988 | Hampton. | |
| 4,800,588 | 1/1989 | Poster, Jr. | 379/412 |
| 4,825,466 | 4/1989 | Dowler et al. | 379/445 |
| 4,853,960 | 8/1989 | Smith | 379/437 |
| 4,860,350 | 8/1989 | Smith | 379/412 |
| 4,910,770 | 3/1990 | Collins et al. | 379/399 |
| 4,919,544 | 4/1990 | Graham | 379/399 |
| 4,932,051 | 6/1990 | Karan et al. | 379/399 |
| 4,945,559 | 7/1990 | Collins et al. | 379/399 |
| 4,949,376 | 8/1990 | Nieves et al. | 379/399 |
| 4,979,209 | 12/1990 | Collins et al. | 379/399 |
| 5,102,347 | 4/1992 | Cote et al. | 439/412 |
| 5,153,910 | 10/1992 | Mickelson et al. | 379/399 |

TELEPHONE NETWORK ENCLOSURE CONTAINING PROTECTED TERMINATION DEVICE

This application is a continuation-in-part of U.S. Ser. No. 07/523,457, filed on May 15, 1990, now U.S. U.S. Pat. No. 5,153,910, the disclosure of which is incorporated herein by reference.

This invention concerns telephone network interface devices. Such devices are shown in the following U.S. Pat. Nos.: 4,488,008; 4,560,839; 4,588,238; 4,624,514; 4,647,725; 4,723,919; 4,741,032; 4,742,541, 4,749,359; 4,800,588; 4,825,466; 4,945,559; 4,979,209. Such devices provide demarcation between the telephone company lines and the telephone subscriber's wiring. Such devices are generally compartmentalized so that the subscriber does not have access to the telephone company's portion of the device. The subscriber has access to a jack, typically an RJ-11C jack, and to terminals to which the subscriber's wiring can be connected. Such jack and terminals are often contained in a network interface module.

This invention is particularly concerned with network interface modules of the type that can be stacked in a side-by-side arrangement in, say, a substantially rectangular telephone network interface enclosure capable of handling a multiplicity of telephone lines. Examples of such enclosures are shown in U.S. Pat. Nos. 4,749,359 and 5,153,910. Examples thereof also are Sylvania CP-761 and CP-765 Network Interface Devices and Keptel SNI-4600 Telephone Network Interface. In such enclosures, the network interface module is generally located in the telephone subscriber's compartment while a protector unit for the module is located separately in the telephone company's compartment.

SUMMARY OF THE INVENTION

In this invention the protector unit is incorporated within the network interface module, herein called network termination module. Such an arrangement provides substantial space savings, which permits almost doubling the number of modules within an enclosure.

This invention discloses a telephone network interface enclosure comprising a telephone company compartment having a cover therefor and a telephone subscriber compartment having a cover therefor. A network termination module containing a protector element is disposed in the network interface enclosure. One end of the network termination module is secured in the telephone subscriber compartment while the other end is secured in the telephone company compartment.

BRIEF DESCRIPTION OF DRAWING

In FIG. 4, the telephone company compartment of the enclosure is exposed, while in FIG. 5 it is covered.

DESCRIPTION OF PREFERRED EMBODIMENT

Figure 1:
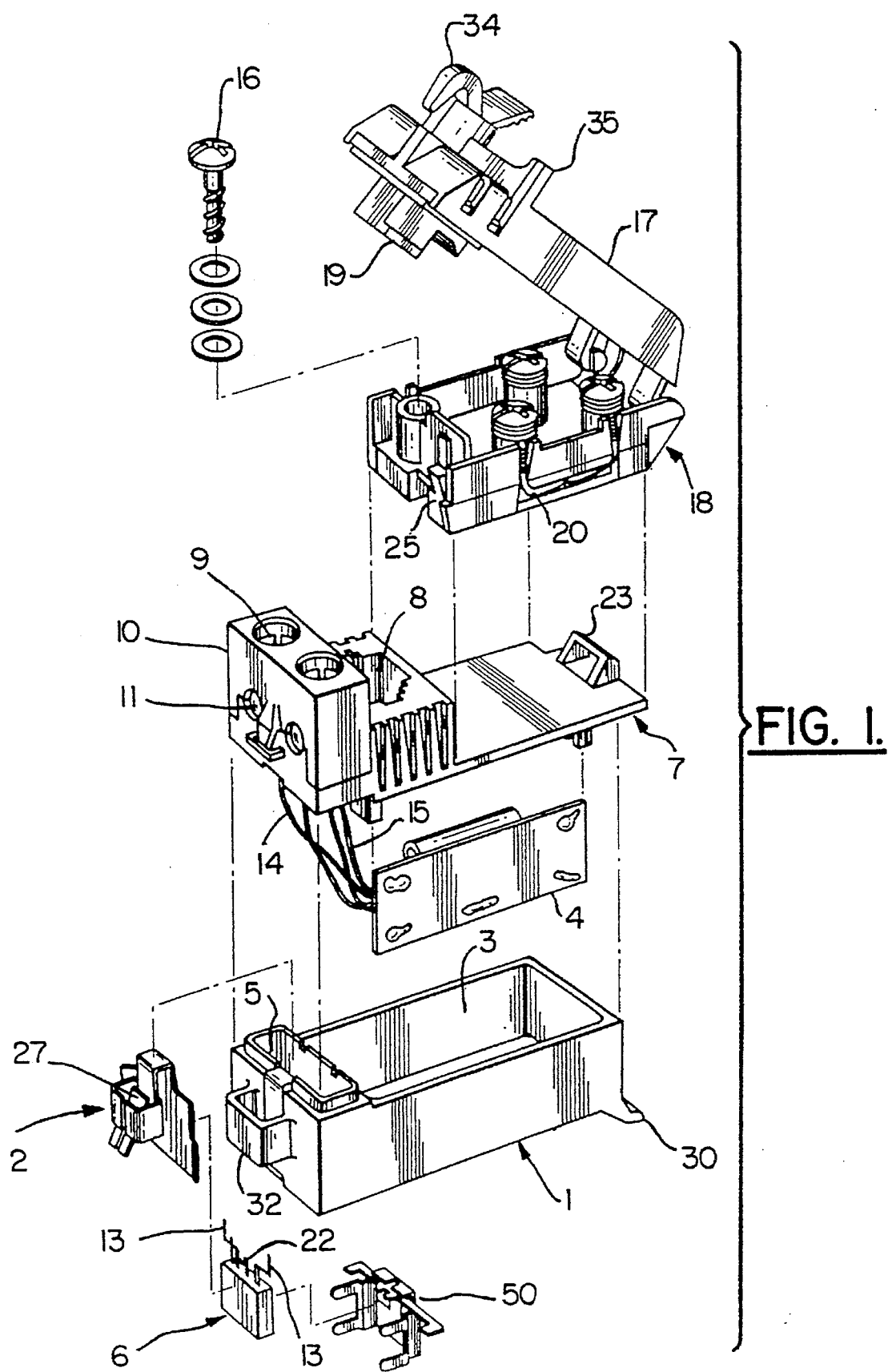
FIG. 1 is an exploded perspective view of one example of a network termination module in accordance with this invention.
Figure 1A:
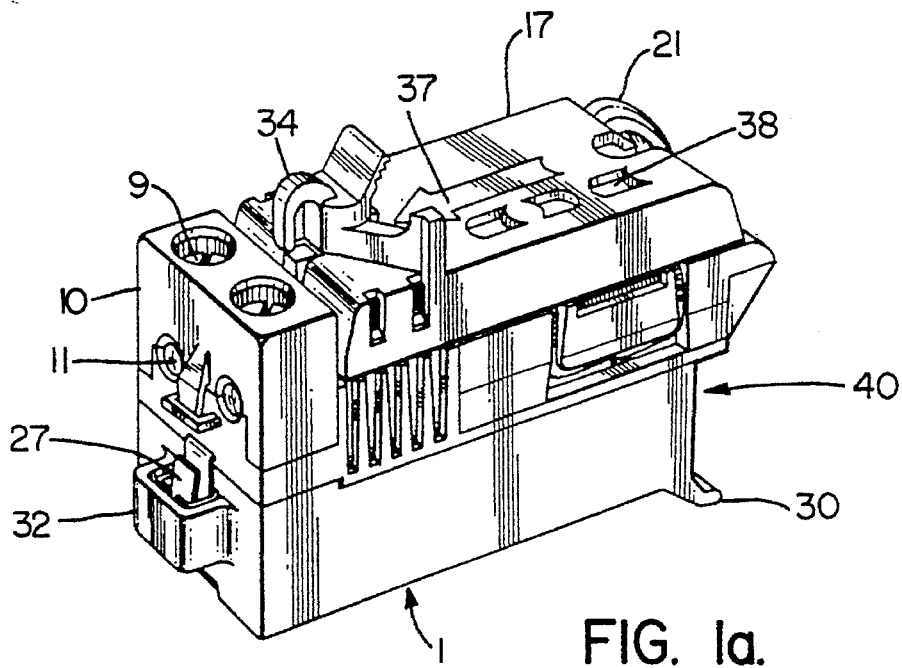
FIG. 1a shows the module with its cover closed.
Figure 1B:
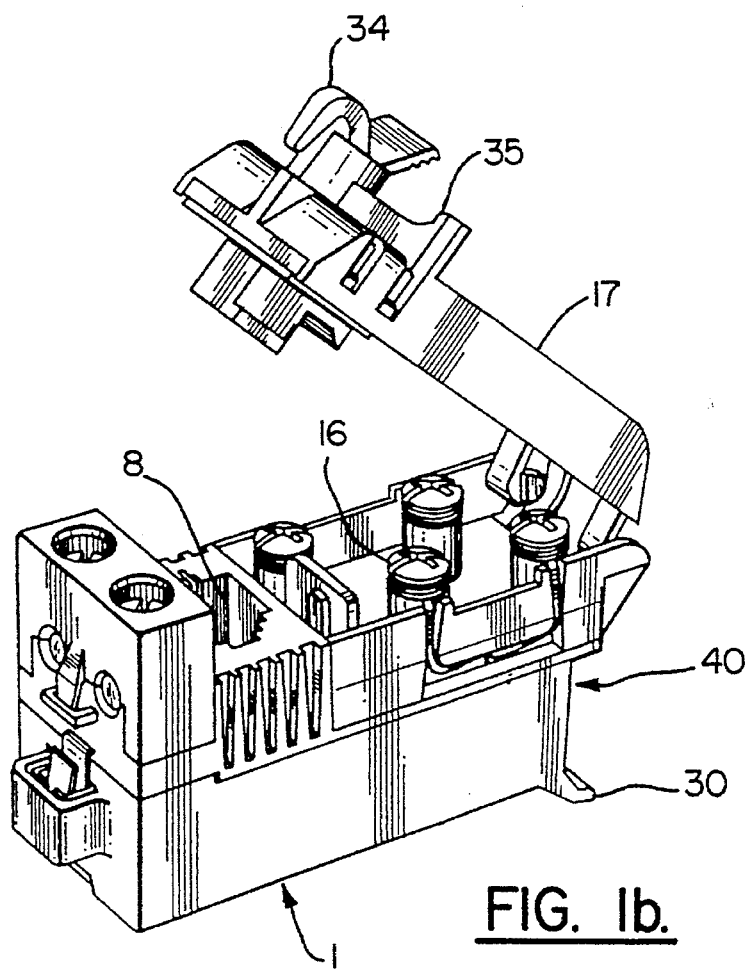
FIG. 1b shows the module with its cover open.
Figure 2:
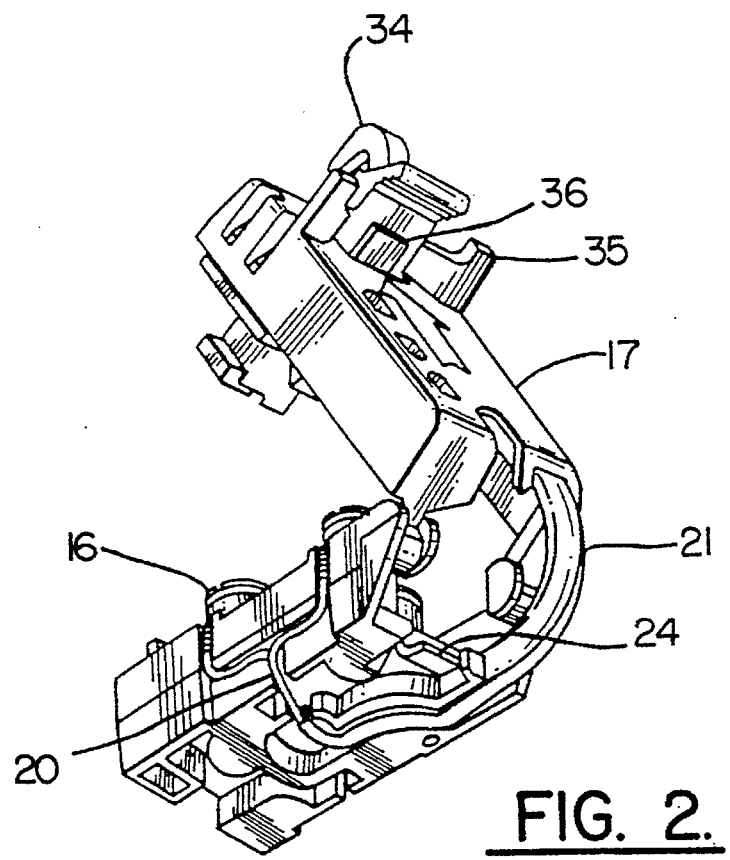
FIG. 2 is a perspective bottom view of the part of the module that contains the subscriber terminals and the cover.
Figure 3:
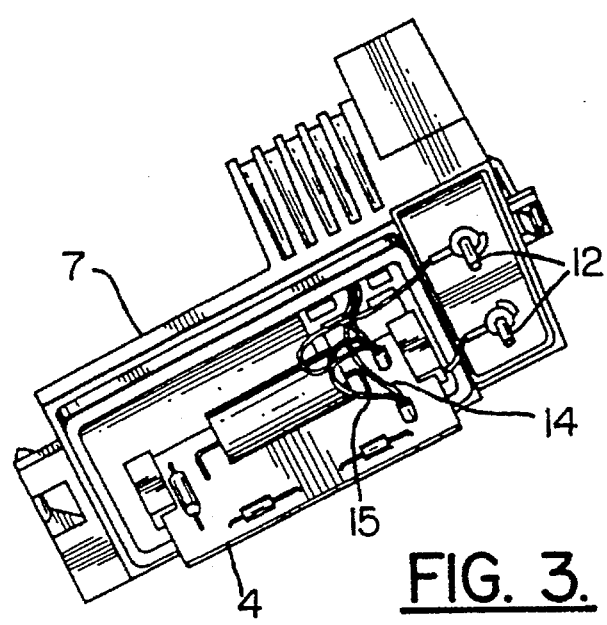
FIG. 3 is a perspective bottom view of the part of the module that contains the line terminals and the telephone jack.

One example of a network termination module 40 in accordance with this invention, as shown in the drawings, comprises a base structure 1 having a means for grounding 2 at one end thereof. Disposed within compartment 3 of base structure 1 is a telephone electronic circuit 4, for example, a maintenance termination unit or a half-ringer. Disposed within compartment 5 of base structure 1 is a protector element 6. Protector element 6 can be a bidirectional voltage sensitive switch, for example, a Surgector made by RCA Corporation or a Sidactor made by Teccor Electronics, Inc., as disclosed in U.S. patent application Ser. No. 07/705,215, the disclosure of which is incorporated herein by reference. Disposed on base structure 1 is a support member 7 on which are disposed a telephone jack 8 and a pair of line terminals 9. Telephone company wiring can be connected to line terminals 9 through wire entry ports 11. Bottom extensions 12 of line terminals 9 are connected to terminals 13 of protector element 6. Wires 14 serve to connect line terminals 9 to telephone electronic circuit 4, and wires 15 serve to connect line terminals 9 to telephone jack 8. Subscriber terminals 16 and openable cover 17 are supported on terminal strip 18. Subscriber terminals 16 are electrically connected to telephone plug 19 by means of wires 20 and cable 21. When openable cover 17 is closed, telephone plug 19 is inserted into telephone jack 8 which establishes electrical connection between line terminals 9 and subscriber terminals 16. The electrical connection is broken when openable cover 17 is opened.

Grounding terminal 22 of protector element 6 is connected to means for grounding 2 in order to provide for the grounding of a voltage or current surge appearing at either line terminal 9. Protector element 6 is encased in protector assembly 50 to which means for grounding 2 is attached.

Support member 7 can be secured to base structure 1 by ultrasonic welding. Support member 18 can be removably attached to support member 7 by means of hinge means 23 on support member 7, into which fits extension 24 of support member 18, and by means of releasable snap latch 25 fitting into an indent in support member 7. The removability of support member 18 permits replacement of telephone plug 19 and subscriber terminals 16, if necessary, without the need of replacing the entire module.

Figure 4:
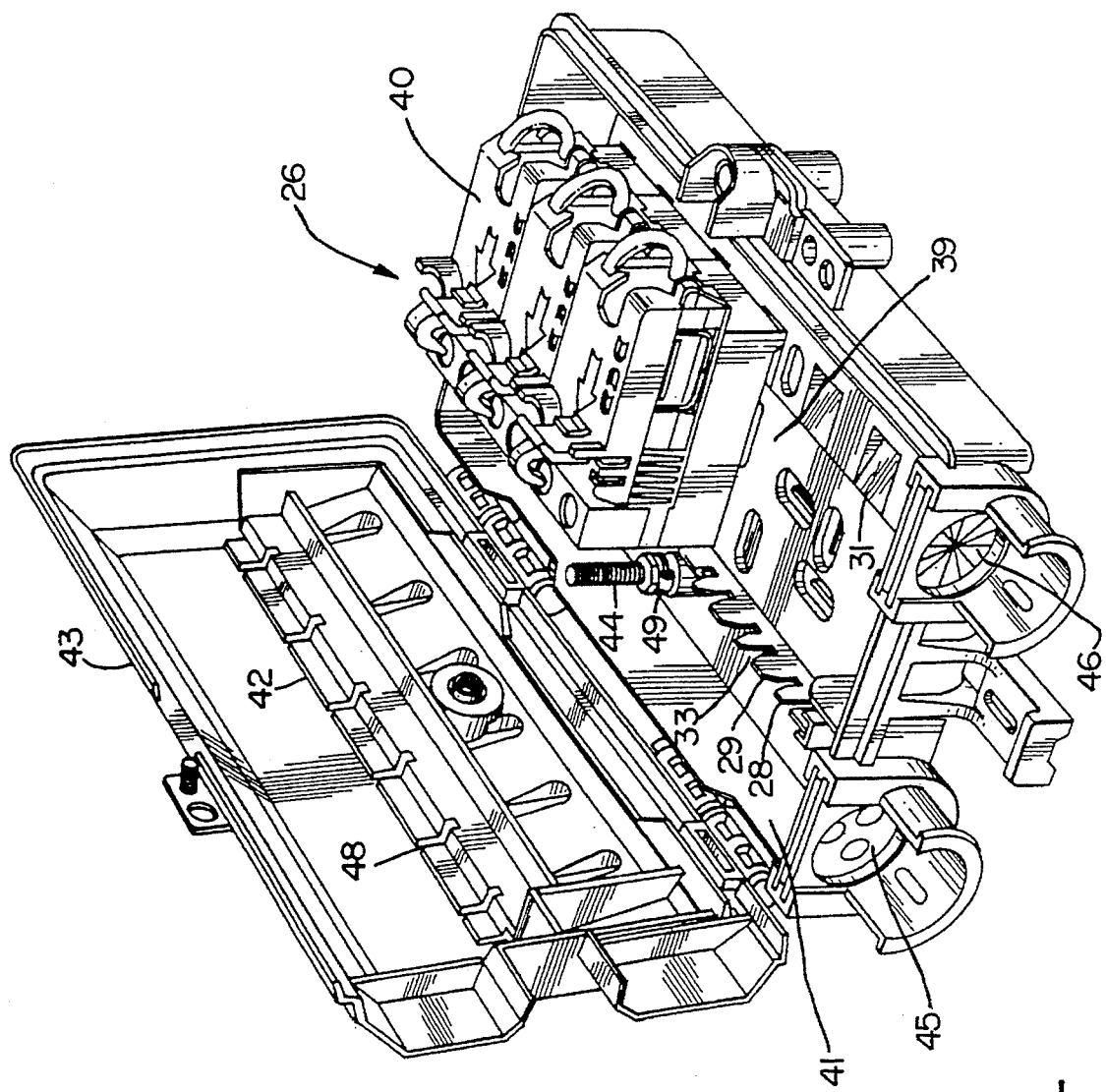
FIG. 4 and FIG. 5 are perspective views of a telephone network enclosure containing the module of FIG. 1.
Figure 5:
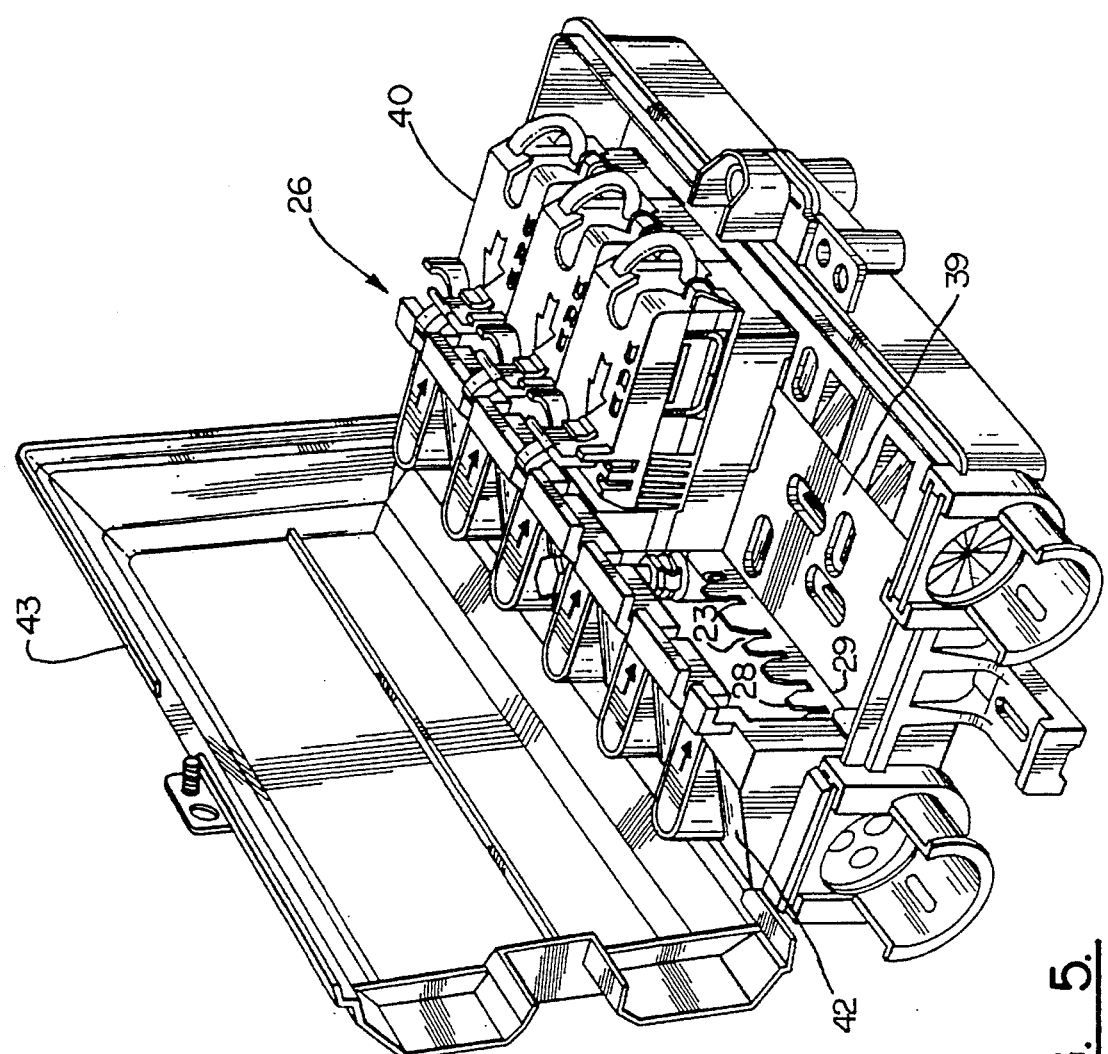

FIGS. 4 and 5 show a telephone network interface enclosure 26 in which one or more network termination modules 40 could be mounted. Enclosure 26 has a subscriber compartment 39, a telephone company compartment 41, a telephone company cover 42 and a subscriber cover 43. Disposed within telephone company compartment 41 is a grounding strip 29. When telephone company cover 42 is closed, it covers and prevents access to grounding strip 29 and to line terminals 9. Thus, one end of module 40 is in subscriber compartment 39 which the other end is in telephone company compartment 41.

Module 40 is mounted in enclosure 26 by means of two tabs 30 fitting into recessed depressions 31 of enclosure 26 and by means of grounding clip 27, comprising part of means for grounding 2 of module 40, clipping onto lug 28 of grounding strip 29. The resiliency of grounding clip 27 aids in its securing onto lug 28. In such an arrangement, tabs 30 on base structure 1 would be inserted into recessed depressions 31 before forcing grounding clip 27 down onto lug 28.

Grounding strip 29 is connected to grounding bolt 44 which would be connected to earth ground upon installation of enclosure 26.

Telephone company wiring and grounding would be through grommet 45. Subscriber wiring would be through grommet 46.

In one embodiment, grounding strip 29 would be orthogonally mounted on back wall 47 of enclosure 26 by fitting into two upright slots 48 and secured by a nut 49 threaded onto bolt 44.

Network termination module 40 may have a shroud 32 surrounding grounding clip 27 for protection thereof. Shroud 32 may fit into notches 33 of grounding strip 29 in order to aid in securing the network interface module in enclosure 26.

Cover 17 has a hook 34 and alignment tabs 35 thereon so that rotation of a padlock (not shown) is prevented when the padlock hasp is placed under hook 34 and over alignment tabs 35. The purpose of such a padlock is to prevent unauthorized access to subscriber terminals 16 and jack 8 by padlocking cover 17 closed.

Cover 17 is secured in the closed position by means of snap action latch 36. Cover 17 can be opened by pressing snap action latch 36 in the direction of arrow 37. Arrow 37 may have a textured writing surface so that a telephone subscriber's telephone number may be written thereon.

Cover 17 has test access holes 38 small enough to prevent finger contact but through which telephone company probes may be inserted to verify telephone service while cover 17 remains closed.

We claim:

1. A telephone network interface enclosure comprising: a telephone company compartment; a telephone subscriber compartment; a cover for the telephone company compartment; a cover for the telephone subscriber compartment; at least one stand-alone network termination module disposed in the network interface enclosure, the network termination module containing a protector; one end of the network termination module being secured in the telephone subscriber compartment, the other end of the network termination module being secured in the telephone company compartment.

2. The network interface enclosure of claim 1 wherein the protector is connected to a ground in the telephone company compartment.

3. A network interface enclosure comprising: a telephone company compartment; a telephone subscriber compartment; a back wall; an elongated metal grounding strip disposed in the telephone company compartment and orthogonally mounted on the back wall; at least one network termination module having two ends disposed in the network interface enclosure, the network termination module having a grounding clip at one end thereof; a protector disposed within the network interface module, the protector being electrically connected to the grounding clip; the network termination module being secured to the grounding strip by means of the grounding clip fitting thereonto resiliently.

4. A network interface enclosure comprising a telephone company compartment; a telephone subscriber compartment; a back wall; an elongated metal grounding strip disposed in the telephone company compartment and orthogonally mounted on the back wall; at least one network termination module having two ends disposed in the network interface enclosure, the network termination module having a grounding clip at one end thereof and at least one tab at the end thereof opposite the grounding clip end, said tab extending into an undercut depression in the back wall; a protector disposed in the network interface module, file protector being electrically connected to the grounding clip; the network termination module being secured to the grounding strip by means of the grounding clip fitting thereonto resiliently.

5. A network interface enclosure comprising: a telephone company compartment; a telephone subscriber compartment: a back wall: an elongated metal grounding strip disposed in the telephone company compartment and orthogonally mounted on the back wall; at least one network termination module having two ends disposed in the network interface enclosure, the network termination module having a grounding clip at one end thereof and two tabs at the end thereof opposite the grounding clip end, said tabs extending into undercut depressions in the back wall, the combination of said tabs and said grounding clip being means for mounting and securing the network termination module in the network interface enclosure: a protector disposed within the network interface module, the protector being electrically connected to the grounding clip; the network termination module being secured to the grounding strip by means of the grounding clip fitting thereonto resiliently.

* * * * *

UNITED STATES PATENT AND TRADEMARK OFFICE
CERTIFICATE OF CORRECTION

PATENT NO. : 5,479,505
APPLICATION NO. : 07/956516
DATED : December 26, 1995
INVENTOR(S) : Walter K. Butler et al.

Page 1 of 1

It is certified that error appears in the above-identified patent and that said Letters Patent is hereby corrected as shown below:

On the Title Page

Notice:

Change "The portion of the term of this patent subsequent to Oct. 6, 2009 has been disclaimed." to -- The portion of the term of this patent subsequent to the expiration of U.S. Patent No. 5,153,910, May 15, 2010, is disclaimed. --

Signed and Sealed this

Tenth Day of November, 2009

David J. Kappos
*Director of the United States Patent and Trademark Office*